United States Patent

Takada et al.

[11] Patent Number: 5,638,870
[45] Date of Patent: Jun. 17, 1997

[54] FIBER-REINFORCED THERMOPLASTIC TUBULAR BODY

[75] Inventors: Nobuhiro Takada; Tomoyoshi Tsurufuji, both of Tokyo, Japan

[73] Assignee: Daiwa Seiko, Inc., Tokyo, Japan

[21] Appl. No.: 40,264

[22] Filed: Mar. 30, 1993

[30] Foreign Application Priority Data

Mar. 31, 1992 [JP] Japan .................................. 4-077082
Mar. 31, 1992 [JP] Japan .................................. 4-077083

[51] Int. Cl.$^6$ ............................................. F16L 11/08
[52] U.S. Cl. ........................... 138/125; 138/137; 138/174
[58] Field of Search ............................. 138/123, 124,
138/125, 126, 127, 137, 177, 178, 172,
174; 156/287, 194; 264/167, 257, 258,
324, 326, 320, 332; 139/387 R

[56] References Cited

U.S. PATENT DOCUMENTS

| | | | |
|---|---|---|---|
| 2,082,611 | 6/1937 | Benge | 138/174 |
| 2,929,409 | 3/1960 | Waehner | 138/174 |
| 2,977,839 | 4/1961 | Koch | 138/125 |
| 3,022,802 | 2/1962 | Lewis | 138/125 |
| 3,156,489 | 11/1964 | Deringer | 138/174 |
| 3,479,670 | 11/1969 | Medell | 138/125 |
| 3,633,629 | 1/1972 | Rider | 138/127 |
| 3,822,157 | 7/1974 | Lee | 156/194 |
| 3,974,012 | 8/1976 | Hogarth | 138/174 |
| 4,308,895 | 1/1982 | Greco | 138/125 |
| 4,923,660 | 5/1990 | Willenberg et al. | 263/324 |
| 5,236,018 | 8/1993 | Kobayashi et al. | 138/172 |
| 5,328,742 | 7/1994 | Tukihara | 138/174 |
| 5,360,503 | 11/1994 | Coffy | 264/324 |

FOREIGN PATENT DOCUMENTS

| | | |
|---|---|---|
| 58-53890 | 12/1983 | Japan . |
| 61-224921 | 10/1986 | Japan . |
| 62-135537 | 6/1987 | Japan . |
| 1-163964 | 11/1989 | Japan . |

*Primary Examiner*—David Scherbel
*Assistant Examiner*—James F. Hook
*Attorney, Agent, or Firm*—Longacre & White

[57] ABSTRACT

A tubular body made of thermoplastic resin as the matrix of the body. The tubular body is formed from a woven fabric and sheet assembly including woven fabrics each having reinforcing fibers and thermoplastic fibers interwoven with the woven fabric, and a uniformly oriented or paralleled fiber sheet made of fiber bundles which include reinforcing fibers and thermoplastic resin fibers mixed with the reinforcing fibers. Since the assembly does not become sticky at the room temperature and is wound onto a core without heating process, the assembly can be formed into a desired tubular form with ease.

3 Claims, 6 Drawing Sheets

FIG. 21

FIBER-REINFORCED THERMOPLASTIC TUBULAR BODY

BACKGROUND OF THE INVENTION

The present invention relates to a tubular body made of a thermoplastic resin as the matrix of the body, and a method of manufacturing the body, and more particularly relates to such a tubular body appropriate for a fishing rod, and a method of manufacturing the body.

A conventional method of manufacturing a fishing rod of a thermoplastic resin as the matrix of the rod was disclosed in the Japanese Patent Application No. 53890/83. In the method, a woven fabric made of reinforcing carbon or glass fibers as warp and a sheet made of a hard thermoplastic resin and softened by heating are overlaid and conjoined together under pressure to constitute a thin sheet, such thin sheets and polyethylene films are heated and stratified together to constitute a stratified sheet, the stratified sheet is tubularly shaped to constitute a tubular body including the carbon or glass fibers extending in the longitudinal direction of the body, and the body is shaped into a desired form for the fishing rod and finally reinforced with a room-temperature-setting resin and a fibrous material. Because of the method, the fishing rod is easier to form it and automate the manufacturing thereof and less in the difference of strength of the rod than a fishing rod made of a thermosetting resin. However, since the thin sheets each including the woven fabric and the thermoplastic resin sheet conjoined thereto under pressure are stratified with the polyethylene films, the amount of the resins of the former fishing rod is large and the ratio of the weight of the reinforcing fibers of the rod to that of the resins thereof is small. For that reason, the fishing rod is low in strength and rigidity and large in weight. Since the thin sheets are heated and shaped after the heating of the thermoplastic resin sheets, it is difficult to tubularly shape the stratified sheet. Therefore, the efficiency of the tubular shaping is low. Since the stratified sheet is tubularly shaped as it is heated, the reinforcing fibers are likely to be displaced to be nonuniformly distributed. Since the thermoplastic resin is solidified at the room temperature, it cannot be impregnated in between the reinforcing fibers as uniformly as the thermosetting resin for the latter fishing rod. For that reason, the former fishing rod cannot be made as high in elasticity and strength as the latter.

A fishing rod has a different-formed portion which serves as a grip, a reel rest or the like and at which the cross-sectional form of the rod sharply changes. In a method, the different-formed portion is made of a piece stuck to the other portion of the rod. However, the piece is likely to separate from the latter portion or become damaged and to deteriorate the appearance of the rod. In another method, the different-formed portion is made of a fiber-reinforced prepreg impregnated with a thermoplastic resin, wound on the body of the rod and then baked. However, the rod is likely to be damaged at or near the different-formed portion when an external impact acts to the rod.

The body of a fishing rod is made of a fiber-reinforced thermosetting resin, and a fiber-reinforced thermosetting resin is then piled on the body and cut into the external form of the rod to constitute a reel rest integrally conjoined to the body, as disclosed in the Japanese Patent Application (OPI) No. 224921/86 (the term "OPI" as used herein means an "unexamined published application"). However, since the thermosetting resin is used as the matrix of the rod, the reinforcing fibers thereof are likely to twist or meander at the time of the forming of the rod so as to lower the strength thereof before and behind the reel rest. Besides, it is necessary to take the trouble of cutting the piled resin.

If the fishing rod manufactured in the method disclosed in the Japanese Patent Application No. 53890/83 has such a different-formed portion, the reinforcing fibers are likely to meander or break at the time of heating formation so as to lower the strength of the portion and it is very difficult to form the portion.

SUMMARY OF THE INVENTION

The present invention was made in order to solve the problems described above.

Accordingly, it is an object of the invention to provide a tubular body which is appropriate for a fishing rod and high enough in strength and rigidity to withstand an impact well.

It is another object of the invention to provide a method of manufacturing the tubular body.

It is yet another object of the invention to provide a tubular body which has a different-formed portion and is high enough in strength to withstand an impact well.

It is yet another object of the invention to provide a method of manufacturing the latter tubular body.

In order to attain the above-noted and other objects, the present invention provides a method for manufacturing a tubular body, comprising the steps of: providing a fabric material including reinforcing fibers and thermoplastic resin fibers mixed with the reinforcing fibers; mounting the fabric material onto a molding core to provide a substantially tubular member; and molding the substantially tubular member under heat and pressure with a die unit to provide a tubular body. The molding core may be have a projecting portion.

The fabric material preferably includes a woven fabric sheet assembly formed of first and second woven fabrics each made of reinforcing fibers and thermoplastic resin fibers interwoven with the reinforcing fibers, and a sheet made of parallely-arranged fiber bundles and sandwiched between the first and second woven fabrics. The fabric material may further include a thermoplastic resin film on an outer surface of the first woven fabric.

Alternatively, the fabric material may be a cylindrical net made of reinforcing fibers and thermoplastic resin fibers interwoven with the reinforcing fibers.

The fabric material mounting step may be performed by winding the fabric material onto the molding core, tentatively attaching a separate piece on the fabric material thus wound, and further winding a second fabric material including reinforcing fibers and thermoplastic resin fibers interwoven with the reinforcing fibers, thereon, to provide the substantially tubular member, in order to form a piled portion projecting from the tubular body. Also, the fabric material mounting step may be preformed by winding the fabric material onto the molding core, and tentatively attaching a separate piece onto the fabric material thus wound to provide the substantially tubular member, the separate piece being made of thermoplastic resin.

The present invention further provides a tubular body formed from a fabric material including reinforcing fibers and thermoplastic resin fibers mixed with the reinforcing fibers, wherein the fabric material is wound on a molding core, then secured in a molding die unit and thereafter molded under heat and pressure so that the thermoplastic resin fibers are molten and permeate in between the reinforcing fibers to integrally conjoin the reinforcing together by thermoplastic resin.

The fabric material may preferably be a woven fabric sheet assembly formed of first and second woven fabrics each made of reinforcing fibers and thermoplastic resin fibers interwoven with the reinforcing fibers, and a sheet made of parallely-arranged fiber bundles and sandwiched between the first and second woven fabrics. The woven fabric and sheet assembly may have a thermoplastic resin film on an outer surface of the first woven fabric. The fabric material may be formed into a net.

The fabric material may have a portion in which quantity of the reinforcing fibers is larger than that in the other portions thereof in order to reinforce the former portion.

The present invention further provides a tubular body including: a main body made of fiber reinforced thermoplastic reins; and a piled portion projecting from the main body, the piled portion being formed such that a piled part made of thermoplastic resin is tentatively attached onto the main body, and thereafter molten so that the piled part is integrally conjoined to the main body.

The present invention further provides a tubular body having a different-formed portion at which a cross-sectional form of the body conspicuously changes, wherein the different-formed portion is formed such that a fabric material including reinforcing fibers and thermoplastic resin fibers mixed with the reinforcing fibers is heated under pressure so that the thermoplastic resin fibers are molted and conjoined to the reinforcing fibers. The fabric material is preferably formed into a cylindrical net.

DETAILED DESCRIPTION OF THE PREFERRED EMBODIMENTS

Embodiments of the present invention are hereafter described in detail with reference to the drawings attached hereto.

Figure 1:
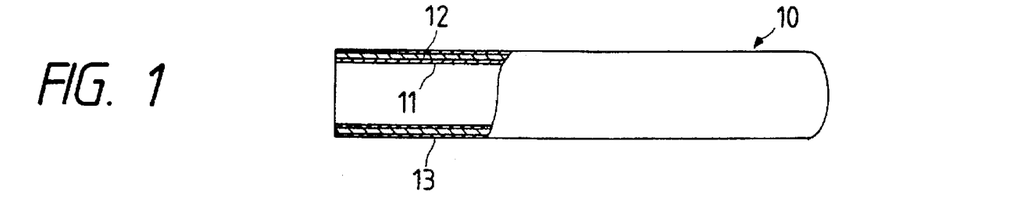
FIG. 1 is a cutaway side view of a tubular body which is an embodiment of the present invention.

FIG. 1 shows a tubular body 10 which is for a fishing rod and is one of the embodiments. The body 10 includes a woven fabric 11, a uniformly oriented fiber sheet 12 and another woven fabric 13 which are integrally conjoined together by a thermoplastic resin.

Figure 2:
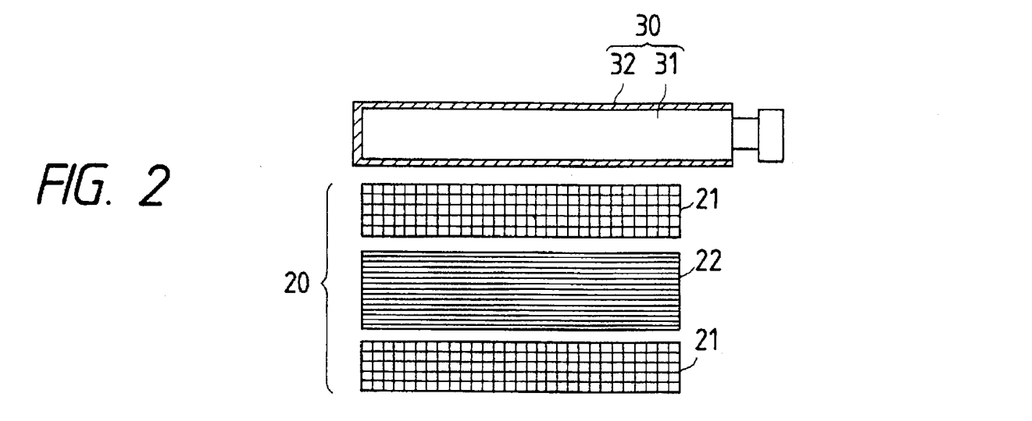
FIG. 2 is a view to illustrate a step of a method for manufacturing the body according to the invention.
Figure 4:
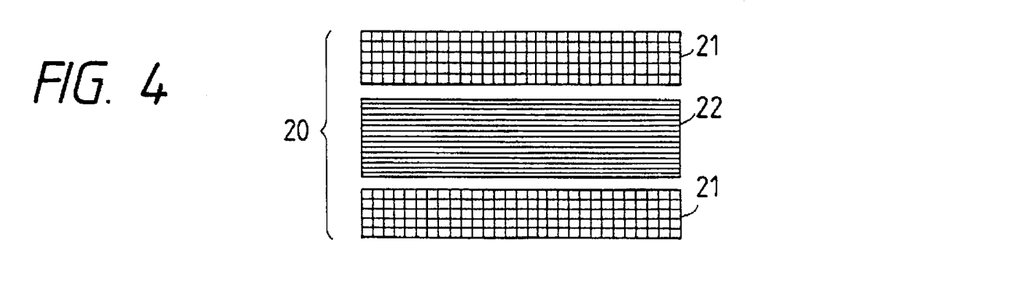
FIG. 4 is a view to illustrate a woven fabric and sheet assembly for the body.
Figure 5:
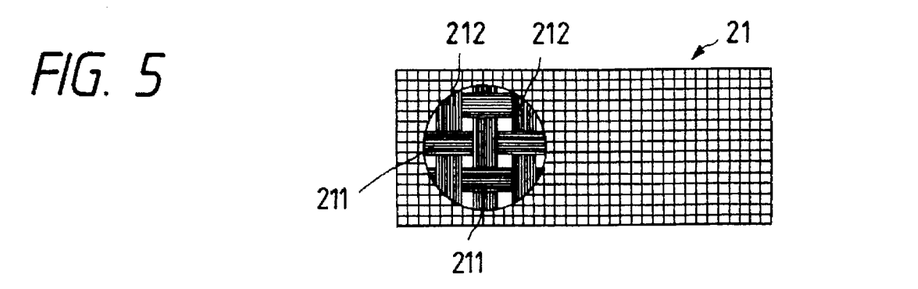
FIG. 5 is a partially enlarged plan view of each woven fabric of the assembly.
Figure 6:
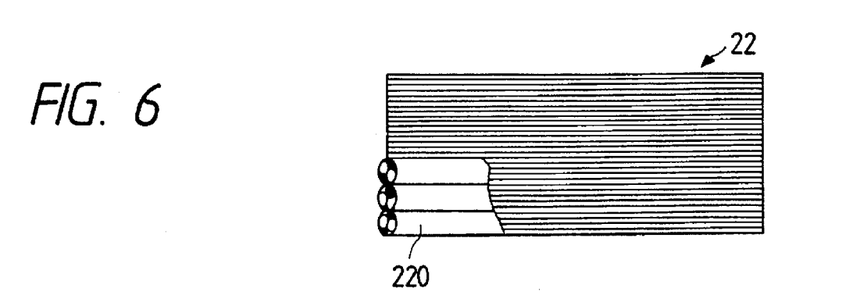
FIG. 6 is a partially enlarged plan view of the uniformly oriented fiber sheet of the assembly.
Figure 7:
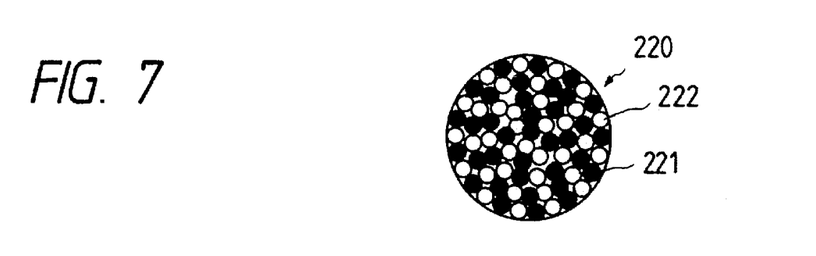
FIG. 7 is an enlarged cross-sectional view of each bundle of fibers of the sheet.

The tubular body 10 and a method in which the body is manufactured and which is another of the embodiments are described in detail from now on. In the method, a molding core 30 including a mandrel 31 and a pressure control member 32 made of a silicone tube or the like and fitted on the mandrel as shown in FIG. 2 is prepared first. A woven fabric and sheet assembly 20 is then wound on the core 30. The assembly 20 includes a woven fabric 21, a uniformly oriented or parallely arranged fiber sheet 22, and another woven fabric 21, as shown in FIG. 4. Each of the woven fabrics 21 is made of reinforcing fibers 211 extending in the longitudinal direction of the fabric, which coincides with the axial direction of the tubular body 10, and thermoplastic resin fibers 212 extending in the transverse direction of the fabric and interwoven with the former fibers, as shown in FIG. 5. Each woven fabric 21 may be made in such another manner that the fibers 211 and 212 are mixed together at a prescribed ratio to constitute the woof of the fabric, which extends in the longitudinal direction of the fabric, the fibers are mixed together at another prescribed ratio to constitute the warp of the fabric, which extends in the transverse direction of the fabric, and both the mixtures are interwoven together to constitute the fabric. The uniformly oriented fiber sheet 22 is made of fiber bundles 220 which include reinforcing fibers 221 and thermoplastic resin fibers 222 mixed therewith and are uniformly oriented in the longitudinal direction of the sheet, as shown in FIGS. 6 and 7. The assembly 20 may be made up of a plurality of the uniformly oriented fiber sheets 22 stuck together without the woven fabric 21 in such a manner that the fiber bundles 220 form cross-stripes. The reinforcing fibers 211 and 221 are carbon fibers, glass fibers, silicon carbide fibers, alumina fibers, aramid fibers, or the like. The thermoplastic resin fibers 212 and 222 are made of polyether ether ketone, polyether imide, polycarbonate, polyphenylene sulfide, polyether sulfide, polyamide, polyethylene terephthalate, polybutylene terephthalate, polypropylene, ABS resin, or the like. Each of the thermoplastic resin fibers 212 and 222 is 2 to 500μ in diameter. It is preferable that each of the fibers 212 and 222 is not larger in diameter than each of the other fibers 211 and 221. It is preferable that the weight ratio of the thermoplastic resin fibers 212 to each woven fabric 21, and that of the other thermoplastic resin fibers 222 to each bundle 220 are Vf 50 to 70%. It is preferable that the reinforcing fibers 211 and 221 of the assembly 20, which extend in the longitudinal direction of the assembly, account for 70% or more of all the reinforcing fibers of the assembly, and the other reinforcing fibers 211 and 221 of the assembly, which extend in the transverse direction of the assembly, account for 30% or less of all the reinforcing fibers of the assembly. If the tubular body 10 has a specially reinforced portion, the quantity of the fibers of the portion, which extend in the circumferential direction of the body, is increased.

Figure 3:
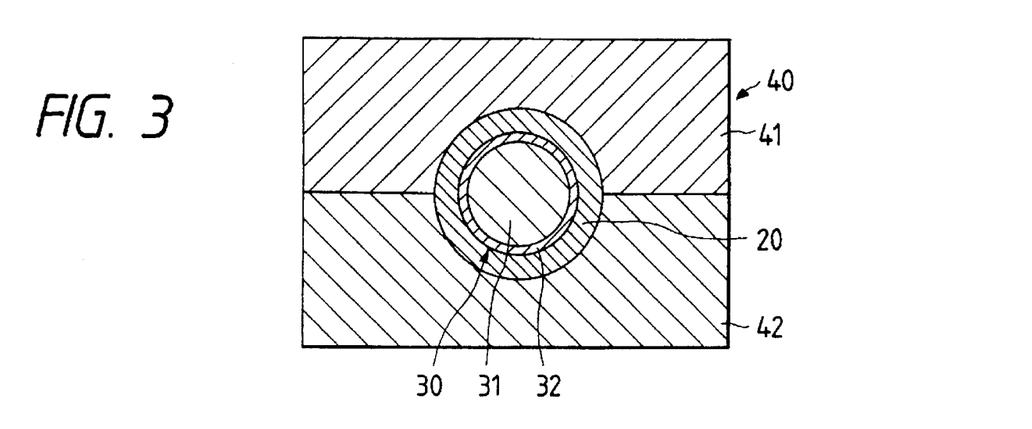
FIG. 3 is a view to illustrate another step of the method.

In the method, the molding core 30 fitted with the woven fabric and sheet assembly 20 wound thereon is secured in a molding die unit 40 including an upper die 41 and a lower die 42, as shown in FIG. 3. Prescribed pressure of 5 to 20 kg/cm$^2$ is then applied to the core 30 and the die unit 40 as they are heated in a temperature range of ±30° C. around the melting point of the thermoplastic resin fibers 212 and 222, so that the fibers are molten and permeate in between the reinforcing fibers 211 and 221 to integrally conjoin them together by the resin to mold the tubular body 10. At that time, pneumatic pressure, hydraulic pressure or the like is applied to the pressure control member 32 of the core 30, and similar pressure is applied to the upper and lower dies 41 and 42 of the die unit 40 to tighten them to each other. The magnitude of the prescribed pressure depends on the quality of the thermoplastic resin fibers 212 and 222, and is such that pressure which acts to the fibers is 3 to 20 kg/cm$^2$ when they are made of polyether ether ketone, polyphenylene sulfide, polyethylene terephthalate, polyamide or polyether imide. The temperature and time of the heating are 360° to 400° C. and 10 to 30 minutes when the fibers 212 and 222 are made of polyether ether ketone. When the fibers 212 and 222 are made of polyamide, polyethylene terephthalate, polycarbonate or polypropylene, the temperature is 260° C. or less but the fibers can be easily molten to flow to result in more cheaply manufacturing a tubular body of smaller thickness. After the tubular body 10 is thus molded, the core 30 and the die unit 40 are separated from each other and the body is then taken out.

Since the woven fabric and sheet assembly 20 is wound on the core 30, heating or power for presetting the assembly in a form is not needed and it is easy to preset the assembly in the form and mold the assembly. Since each woven fabric 21 of the assembly 20 includes the reinforcing fibers 211 and the thermoplastic resin fibers 212 and the uniformly oriented fiber sheet 22 of the assembly includes the reinforcing fibers 221 and the thermoplastic resin fibers 222 having a relatively small quantity and extending in the longitudinal direction of the sheet so as not to scatter from each other, the assembly does not become sticky at the room temperature and it is easy to wind the assembly on the core 30 and preset the assembly in the form. Since the assembly 20 is subjected to the pressure and the heating after being wound on the core 30 and secured thereon with the molding die unit 40, the thermoplastic resin of the assembly can be securely filled in on the reinforcing fibers 211 and 221 thereof so that the tubular body 10 does not have an air bubble, and is high in strength and large in fiber ratio. The peripheral surface of the tubular body 10 is made smooth by the die unit 40. The body 10 does not need to be cut so that the reinforcing fibers 211 and 221 are cut off. The peripheral surface of the tubular body may be polished or/and painted, if necessary. The fibers 211 and 221 can thus be protected to make the strength of the tubular body so high that damage does not expand locally in the body due to an impact thereon.

Instead of the woven fabric and sheet assembly 20, a woven fabric and sheet assembly made of various kinds of reinforcing fibers and thermoplastic resin fibers which are oriented in optional directions and have optional quantities may be used. Although the thermoplastic resin fibers 212 are long fibers, a combination of reinforcing fibers and single fibers made of a thermoplastic resin and adhering thereto or a combination of single fibers made of a thermoplastic resin and bundled together like a non-woven fabric may be used instead of the fibers 212. Each woven fabric 21 may be processed in advance so that the surface of each of the reinforcing fibers 211 and 221 or the surface of each of the bundles thereof is coated with a thermoplastic resin. Instead of the uniformly oriented fiber sheet 22, a three-layer body including a sheet of uniformly oriented or paralleled reinforcing fibers and non-woven fabrics which are made of thermoplastic resin fibers such as 6-nylon fibers of 5 to 15μ in diameter and 3 cm or more in length and are overlaid on the obverse and reverse sides of the sheet respectively may be used. Although the pressure control member 32 of the molding core 30 is made of a silicone tube or the like, the member may be made of an elastic material such as rubber to utilize the elasticity of the member to apply the pressure to the fabric and sheet assembly 20 wound thereon. The member 32 may not be provided if enough pressure can be applied to the assembly 20 without the member.

Since the woven fabric and sheet assembly 20 including the woven fabrics 21 and the uniformly oriented fiber sheet 22 is cylindrically wound on the core 30 and then processed so that the thermoplastic resin fibers 212 and 222 of the fabrics and the sheet are molten and integrally conjoined to the reinforcing fibers 211 and 221 of the fabrics and the sheet to mold the tubular body 10, the reinforcing fibers are uniformly distributed in the body. Besides, the matrix of the body 10 is made from the thermoplastic resin fibers 212 and 222 through the melting thereof. For these reasons, the body 10 is so high in strength that it is not damaged even if an impact acts to the outer surface of the body. The resin fibers 212 and 222 of the assembly 20 can be decreased to lower the ratio of the resin of the assembly to heighten the ratio of the reinforcing fibers of the tubular body 10 to make it low in weight but high in rigidity. Since polyether ether ketone is equal in strength and modulus of elasticity to an epoxy resin but is at least six times higher in energy release ratio and at least ten times higher in breaking strain than the latter and is higher in ductility and tenacity than the latter, the adhering property of the thermoplastic resin fibers 212 and 222 to the reinforcing fibers 211 and 221 and the modulus of elasticity of the resin of the tubular body 10 can be heightened to improve the function thereof if the thermoplastic resin fibers are made of the polyether ether ketone.

Figure 8:
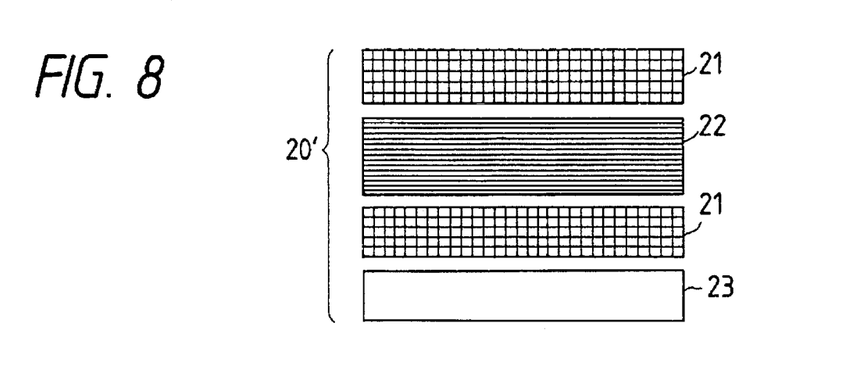
FIG. 8 is a view to illustrate a modification of the assembly.

A thermoplastic resin film may be provided as a protective or decorative layer on the peripheral surface of the tubular body 10. It is preferable that the film is made of 50% or less of reinforcing fibers and the rest of a thermoplastic resin, and is 0.01 to 0.1 mm in thickness. If the reinforcing fibers 211 and 221 are carbon fibers or glass fibers, the thermoplastic resin for the film should preferably be polyamide, polyethylene terephthalate or polycarbonate because they are high in the tightness of contact with the fibers. The film may be provided on the woven fabric and sheet assembly 20 before the assembly is wound on the molding core 30. In that case, a woven fabric and sheet assembly 20' is made of the woven fabrics 21, the uniformly oriented fiber sheet 22 between the fabrics, and the thermoplastic resin film 23 on the outer surface of the outer fabric as shown in FIG. 8. The assembly 20' can be processed in the same manner as the former assembly 20 to mold a tubular body having the film 23 as the outermost layer of the body.

Since the fabric and sheet assembly 20 made of the reinforcing fibers and the thermoplastic resin fibers is cylindrically wound on the core 30, heating or power for presetting the assembly in the form is not needed and it is easy to preset the assembly in the form and mold the assembly. Besides, the thermoplastic resin is securely filled in on the reinforcing fibers. The tubular body 10 does not have an air bubble, and is high in strength, rigidity and fiber ratio.

Figure 9:
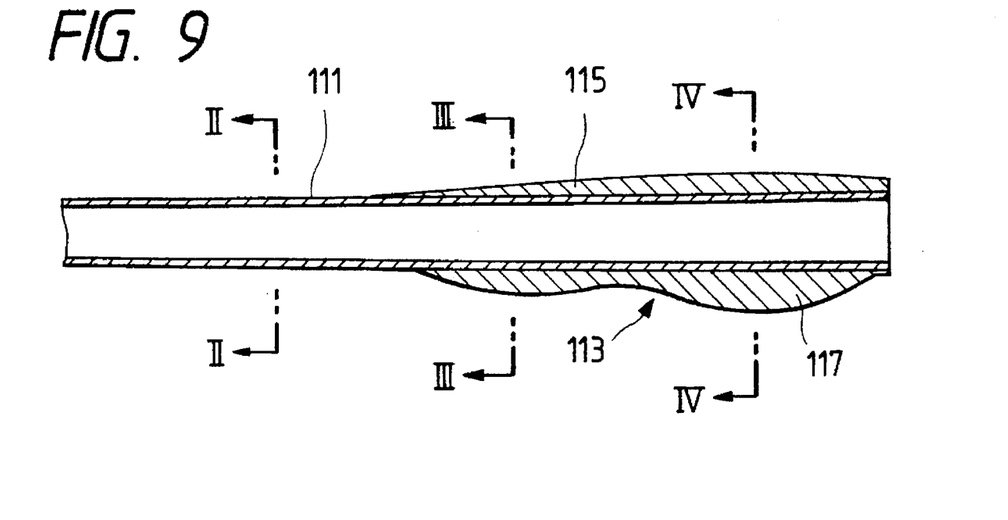
FIG. 9 is a longitudinally sectional view of a tubular body which is yet another embodiment of the invention.
Figure 10:
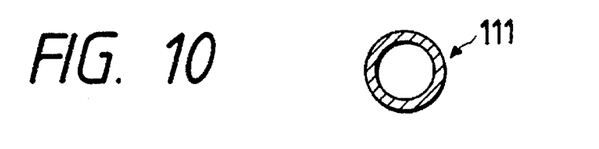
FIG. 10 is a cross-sectional view of the body along lines II—II shown in FIG. 9.
Figure 11:
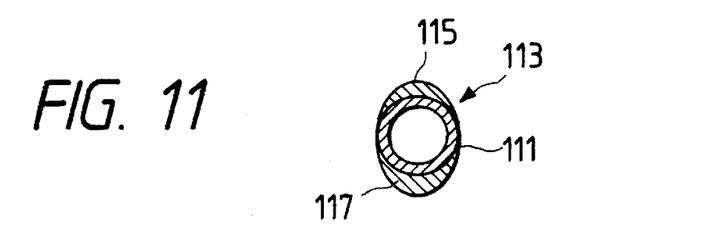
FIG. 11 is a cross-sectional view of the body along lines III—III shown in FIG. 9.
Figure 12:
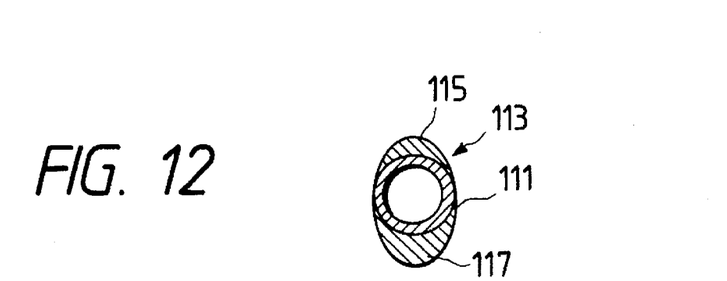
FIG. 12 is a cross-sectional view of the body along lines IV—IV shown in FIG. 9.

FIG. 9 shows a tubular body which is for a fishing rod and is yet another of the embodiments. The tubular body includes a main portion 111, and a piled portion 113 provided thereon to constitute the grip of the rod. The main portion 111 has a circular cross section, as shown in FIG. 10. The piled portion 113 has an elliptic cross section, as shown in FIGS. 11 and 12. The main portion 111 is made of a thermoplastic resin and fibers reinforcing it. The piled portion 113 is made of piled parts 115 and 117, each of which is made of a thermoplastic resin and fibers reinforcing it and is integrally conjoined to the main portion 111 through melting.

Figure 13:
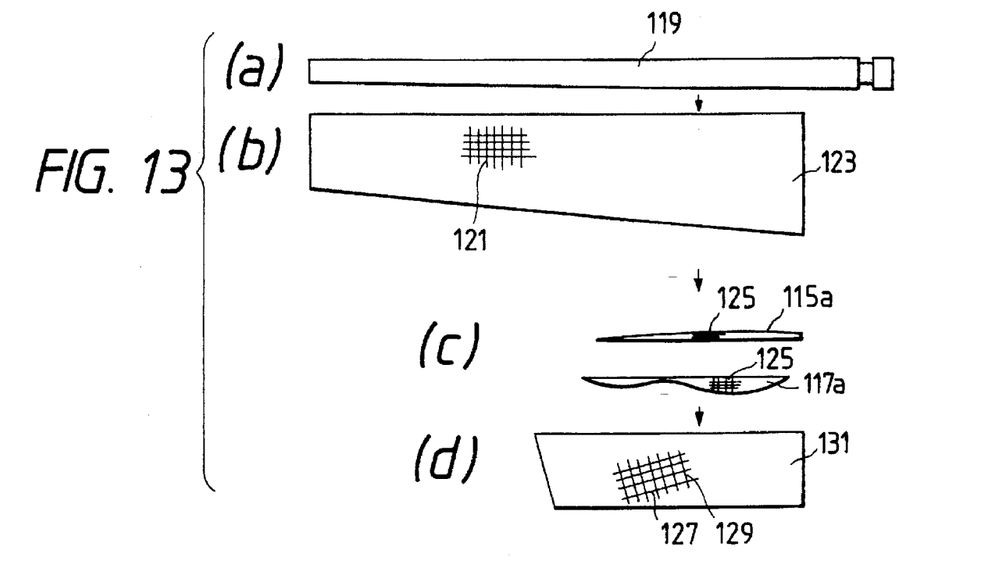
FIG. 13 is a view to illustrate a method for manufacturing the body shown in FIG. 9 according to the invention.
Figure 14:
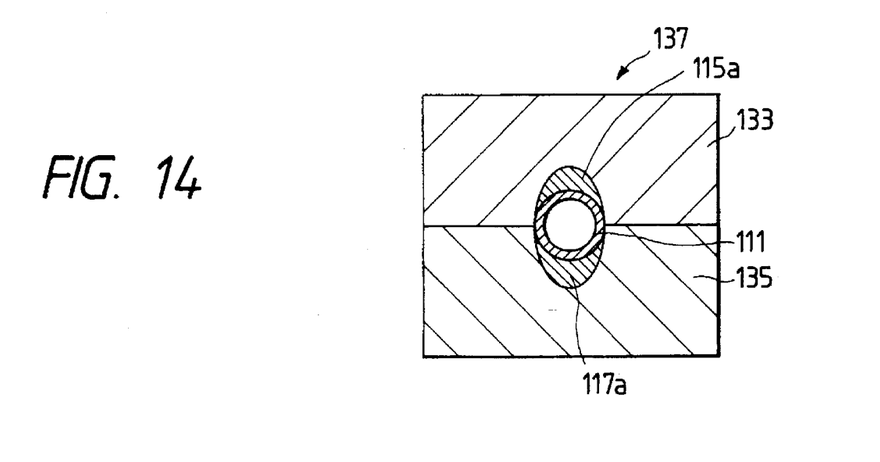
FIG. 14 is a view to illustrate the method.

The tubular body shown in FIG. 9, and a method in which the body is manufactured and which is yet another of the embodiments are described in detail from now on. In the method, a mandrel 119 shown in a part (a) of FIG. 13 is first prepared as a molding core. A prepreg sheet 123 shown in another part (b) of FIG. 13 and made of a thermoplastic resin and reinforcing fibers 121 reinforcing it is then wound on the mandrel 119. Piled pieces 115a and 117a shown in yet another part (c) of FIG. 13 and each made of a thermoplastic resin and reinforcing fibers 125 reinforcing it are thereafter tentatively coupled to the prepreg sheet 123, by adhesive sticking, where the piled portion 113 is to be formed. A woven fabric 131 shown in yet another part (d) of FIG. 13 and made of reinforcing fibers 127 and thermoplastic resin fibers 129 mixed therewith is then wound on the piled pieces 115a and 117a. The woven fabric 131 is an equivalent of the woven fabric and sheet assembly 20 described above. The reinforcing fibers 121, 125 and 127 are carbon fibers, glass fibers, silicon carbide fibers, alumina fibers, aramid fibers, or the like. The thermoplastic resin of the prepreg sheet 123, the piled pieces 115a and 117a and the woven fabric 131 is polyether ether ketone, polyether imide, polycarbonate, polyphenylene sulfide, polyether sulfide, polyamide, polyethylene sulfide, polyamide, polyethylene terephthalate, polybutylene terephthalate, polypropylene, ABS resin or the like. The mandrel 119 thus fitted with the prepreg sheet 123, the piled pieces 115a and 117a and the woven fabric 131 is secured in a molding die unit 137 including an upper die 133 and a lower die 135, as shown in FIG. 14. Prescribed pressure of 5 to 20 kg/cm$^2$ is then applied to the mandrel 119 and the die unit 137 as they are heated in a temperature range of ±30° C. around the melting point of the thermoplastic resin, so that the resin is molten and permeates in between the reinforcing fibers 121, 125 and 127 to integrally conjoin them together by the resin to mold the tubular body. After that, the mandrel 119 and the die unit 137 are separated from each other, and the tubular body is then taken out.

Since the main portion 111 made of the thermoplastic resin and the reinforcing fibers is integrally conjoined with the piled parts 115 and 117 made of the thermoplastic resin and the reinforcing fibers, the main portion is not lowered in quality and strength. Besides, the piled parts 115 and 117 are firmly fixed to the main portion 111 so that the pieces do not separate therefrom. The tubular body which is high enough in strength to be unlikely to be damaged by an external impact and has the piled portion 113 good in appearance and quality can thus be provided. The outermost layer of the piled portion 113 is constituted by the woven fabric 131 made of the reinforcing fibers 127 and the thermoplastic resin fibers 129 mixed therewith so that the quantity of the reinforcing fibers and that of the thermoplastic resin after the molding of the tubular body are well balanced to each other, and the ratio of the reinforcing fibers to the resin is made high. Since the molten resin flows so little that the reinforcing fibers do not meander, the piled portion 113 is so small in nonuniformity of strength and so high in strength that the portion is unlikely to be damaged.

Although the piled pieces 115a and 117a are made of the thermoplastic resin and the reinforcing fibers reinforcing it, the pieces may be made of only the resin. Besides, the pieces may be made of a foaming resin to reduce their weight. The number of the pieces and the forms thereof may be selected depending on the required form and thickness of the piled portion 113. The forms of the pieces may be made nearer those of the molded piled parts 115 and 117 to make it easier to mold them. The piled pieces 115a and 117a may be made of a natural material such as cork. Although the tubular body has the piled portion 113 for the grip of the fishing rod, a tubular body having a piled portion for the reel rest of a fishing rod can also be provided in accordance with the present invention.

It is preferable that the prepreg sheet 123 is an equivalent of the woven fabric and sheet assembly 20 described above. However, a hard thermoplastic sheet made of a thermoplastic resin and reinforcing fibers disposed therein, as disclosed in the Japanese Patent Application No. 53890/83 or the Japanese Utility Model Application (OPI) No. 163964/89 may be used instead of the prepreg sheet 123 so as to be heated to soften to be wound on the mandrel 119.

Since the main portion 111 made of the thermoplastic resin and the reinforcing fibers and the piled pieces 115a and 117a made of the thermoplastic resin and the reinforcing fibers are integrally conjoined to each other through melting, the main portion is not lowered in quality and strength. The piled pieces are firmly fixed to the main portion so that the pieces do not separate therefrom. The tubular body which is unlikely to be damaged by an external impact and has the piled portion 113 good in appearance and quality can thus be provided.

Figure 15:
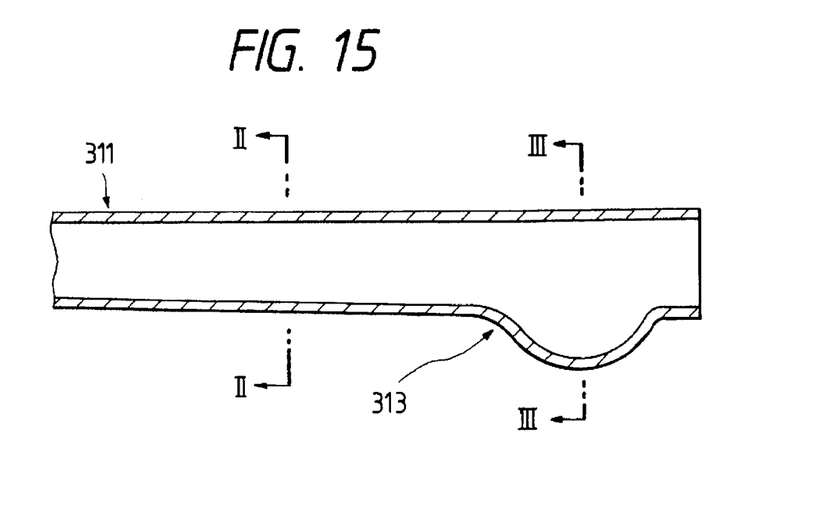
FIG. 15 is a longitudinally sectional view of a tubular body which is yet another embodiment of the invention.
Figure 16:
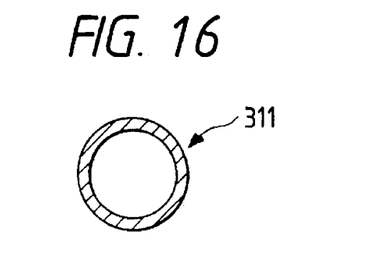
FIG. 16 is a cross-sectional view of the body along lines II—II shown in FIG. 15.
Figure 17:
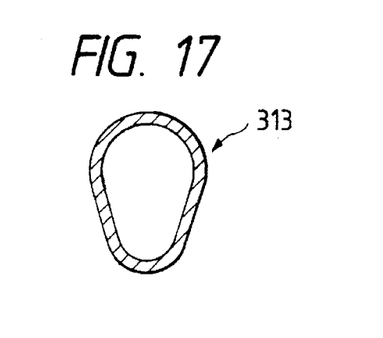
FIG. 17 is a cross-sectional view of the body along lines III—III shown in FIG. 15.
Figure 18:
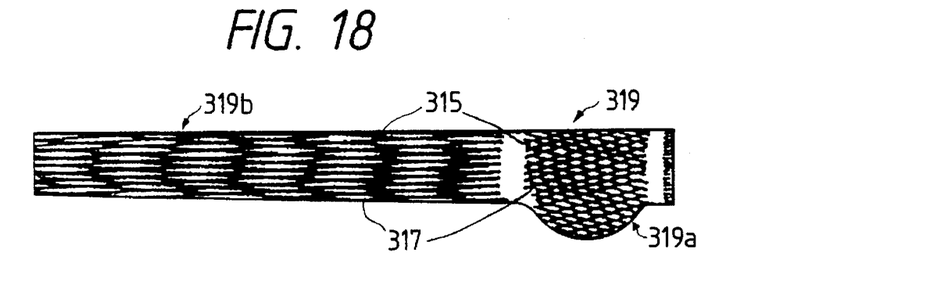
FIG. 18 is a side view of a nearly cylindrical net.

FIG. 15 shows a tubular body which is yet another of the embodiments and includes a cylindrical portion 311 and a different-formed portion 313 at which the cross-sectional form of the body sharply changes. The tubular body is for a fishing rod, and the different-formed portion 313 is for the grip of the rod. The cylindrical portion 311 has a circular cross section, as shown in FIG. 16. The different-formed portion 313 has a cross section shaped as the longitudinal section of an egg, as shown in FIG. 17. The portions 311 and 313 are manufactured together from a nearly cylindrical net 319 made of reinforcing fibers 315 and thermoplastic resin fibers 317 as shown in FIG. 18. For the manufacturing, the thermoplastic resin fibers 317 are molten so that the reinforcing fibers 315 are integrally conjoined to the resin. The net 319 is made of the same fibers as the woven fabric and sheet assembly 20 described above. For the making, the numbers and densities of the fibers 315 and 317, the angle of winding of the fibers and so forth are preset, and the fibers are wound across each other and may be returned and wound again across each other. Beside, fibers uniformly oriented in the longitudinal direction of the net 319, or materials three-dimensionally combined together may be combined with the fibers 315 and 317 as they are wound across each other.

Figure 19:
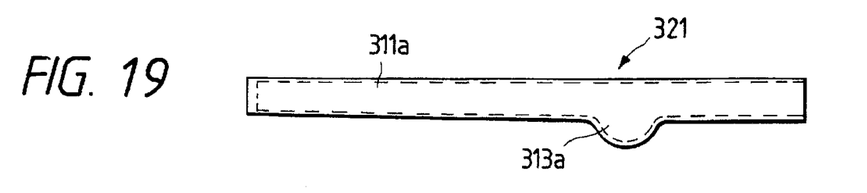
FIG. 19 is a side view of a molding core.
Figure 20:
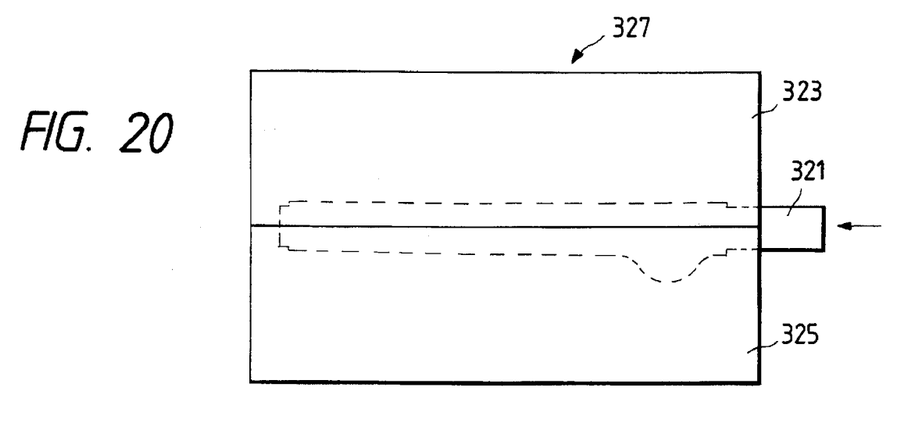
FIG. 20 is a side view to show that the core is set in a molding die unit.

The tubular body shown in FIG. 15, and a method in which the body is manufactured and which is yet another of the embodiments are described in detail from now on. In the method, a molding core 321 made of a silicone tube and shown in FIG. 19 is prepared first. The core 321 is so flexible that when pneumatic pressure, hydraulic pressure or the like is applied to the inner surface of the core, the cylindrical portion 311a and different-formed portion 313a of the core are expanded so that the outer surface of the core has nearly the same form as the inner surface of the tubular body. The nearly cylindrical net 319 is fitted on the core 321. Although FIG. 18 shows the net 319 as if the different-formed portion 319a and cylindrical portion 319b thereof are separate from each other, they are not separate from each other in reality but coupled to each other as the fibers 315 and 317 are wound across each other at a modulated angle and a modulated speed. The net 319 is made of the reinforcing fibers 315 and the thermoplastic resin fibers 317 mixed therewith so that they are coupled to each other to form the net as a woven fabric. The quantity of the reinforcing fibers 315 of the different-formed portion 319a of the net 319, which corresponds to the different-formed portion 313 of the tubular body, is larger than that of the reinforcing fibers 315 of the cylindrical portion 319b of the net, which corresponds to the cylindrical portion 311 of the tubular body. The core 321 fitted with the net 319 is secured in a molding die unit 327 including an upper die 323 and a lower die 325, as shown in FIG. 20. Prescribed pressure of 5 to 20 kg/cm² is then applied to the core 321 and the die unit 327 as they are heated in a temperature range of ±30° C. around the melting point of the thermoplastic resin 317 of the net 319, so that the resin is molten and permeates in between the reinforcing fibers 315 of the net to integrally conjoin them together by the resin to mold the tubular body. At that time, pneumatic pressure, hydraulic pressure or the like is applied to the core 321, and similar pressure is applied to the dies 323 and 325 of the die unit 327 to tighten the dies to each other. After the molding, the core 321 and the die unit 327 are separated from each other, and the tubular body is then taken out.

Since the thermoplastic resin fibers 317 of the net 319 made of the reinforcing fibers 315 and the resin fibers mixed therewith are molten and integrally conjoined to the reinforcing fibers to mold the tubular body, the quantity of the reinforcing fibers and that of the thermoplastic resin after the melting can be well balanced to each other and the ratio of the reinforcing fibers of the body can be made high. Besides, the molten resin flows so little that the reinforcing fibers 315 do not meander. The tubular body which has the different-formed portion 313 and is so low in nonuniformity of strength and so high in strength as to be unlikely to be damaged by an external impact can thus be provided. Since the quantity of the reinforcing fibers 315 of the different-formed portion 313 of the tubular body is equal to or more than that of the reinforcing fibers 315 of the cylindrical portion 311 thereof, the former portion is equal to or higher in strength than the latter so that the uniformity of the strength of the body is high enough to make it unlikely to be damaged. Since the nearly cylindrical net 319 is fitted on the molding core 321, heating or power for presetting the net in a form is not needed and it is easy to preset the net in the form and mold the net.

Figure 21:
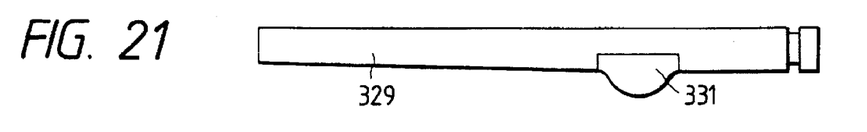
FIG. 21 is a side view of another molding core.

Instead of the core 321 made of the flexible silicone tube, a molding core made of a metal bar 329 and a projecting metal piece movable back and forth relative to the bar, as shown in FIG. 21, may be used so as to be fitted with the net 319 directly. Although the net 319 is directly fitted on the core 321, the present invention may be otherwise embodied so that a woven fabric or the like is wound by a prescribed quantity in a prescribed position on the core, and the net is then fitted on the fabric or the like. If the tubular body is thus made of a plurality of layers, the outermost layer is constituted by the net 319 so that the body does not undergo peeling or tearing. The net 319 may be used instead of the woven fabric 131 mentioned above. Although the tubular body is for the grip of the rearmost portion of the fishing rod, a tubular body having a different-formed portion can also be provided for a golf club, a tennis racket, a handlebar or the like in accordance with the present invention.

What is claimed is:

1. A tubular body formed from a fabric material including reinforcing fibers and thermoplastic resin fibers mixed with said reinforcing fibers, wherein said body is formed by a molding method comprising the steps of winding said fabric material on a molded core, then securing said fabric material in a molding die unit and thereafter molding said fabric material under heat and pressure wherein a thermoplastic resin of said thermoplastic resin fibers is permeated between said reinforcing fibers to integrally conjoin said reinforcing fibers together, said reinforcing fibers being embedded in said thermoplastic resin, wherein said reinforcing fibers are maintained in a uniform arrangement in said fabric material formed by said molding method, wherein said fabric material includes a woven fabric sheet assembly formed of first and second woven fabrics each made of reinforcing fibers and thermoplastic resin fibers interwoven with said reinforcing fibers, and wherein a sheet made of parallely-arranged fiber bundles is sandwiched between said first and second woven fabrics.

2. A tubular body formed from a fabric material including reinforcing fibers and thermoplastic resin fibers mixed with said reinforcing fibers, and a sheet made of parallely-arranged fiber bundles, wherein said fabric material comprises a pressure-formed outer peripheral surface whereby a pressure applied to said outer peripheral surface causes a thermoplastic resin of said thermoplastic resin fibers to intermingle with said reinforcing fibers, wherein said fabric material includes a woven fabric sheet assembly formed of first and second woven fabrics each made of reinforcing fibers and thermoplastic resin fibers interwoven with said reinforcing fibers, and wherein said sheet made of parallely-arranged fiber bundles is sandwiched between said first and second woven fabrics.

3. A tubular body formed from a fabric material comprising:

a woven fabric sheet assembly formed of first and second woven fabrics each made of reinforcing fibers and thermoplastic resin fibers interwoven with said reinforcing fibers; and a sheet made of parallely-arranged fiber bundles interposed between said first and second woven fabrics, wherein said thermoplastic resin fibers are mixed with said reinforcing fibers during a molding process.

* * * * *